United States Patent Office 2,949,460
Patented Aug. 16, 1960

2,949,460

CERTAIN THIAZOLIDINE-4-ONES

Renat Herbert Mizzoni, Long Valley, N.J., assignor to Ciba Pharmaceutical Products, Inc., Summit, N.J., a corporation of New Jersey No Drawing. Filed Jan. 26, 1959, Ser. No. 788,756

11 Claims. (Cl. 260—240)

This invention relates to new thiazolidine-4-one compounds. More particularly, the invention concerns 2-phenyl-imino-3-phenyl-thiazolidine-4-ones, in which one of the phenyl radicals contains in the 4-position a group of the formula Py—[C(R)=CH]$_n$—, in which Py stands for a pyridyl group, R for hydrogen, lower alkyl or monocyclic carbocyclic aryl, and $n$ represents a whole number for 0 to 2, and the other phenyl radical contains in the 4-position an N,N-di-lower alkyl-amino-lower alkoxy group, or particularly an alkoxy group having from 4 to 5 carbon atoms, the salts and mixtures of such compounds, as well as process for the preparation thereof.

A pyridyl group is represented by 3-pyridyl, 4-pyridyl, or especially 2-pyridyl, which are preferably unsubstituted or may contain lower alkyl, e.g. methyl or ethyl; nitro or amino groups, or halogen atoms, e.g. chlorine or bromine, as substituents. R represents primarily hydrogen; it may also stand for lower alkyl, e.g. methyl or ethyl. In addition, a monocyclic carbocyclic aryl radical, e.g. phenyl or phenyl substituted, for example, by halogen, e.g. chlorine or bromine, or lower alkoxy, e.g. methoxy or ethoxy, may be anticipated as the radical R.

N,N-di-lower alkyl-amino-lower alkoxy groups are represented by 2-dimethylaminoethoxy or 2-diethylaminoethoxy. An alkoxy group having from 4 to 5 carbon atoms is represented by n-butyloxy, isobutyloxy, secondary butyloxy, n-pentyloxy, or isopentyloxy.

Salts of the new compounds of this invention are, particularly, therapeutically acceptable acid addition salts, for example, those with inorganic acids, such as hydrohalic acids, e.g. hydrochloric or hydrobromic; thiocyanic acid; or sulfuric or phosphoric acids; or those with organic acids, such as, formic, acetic, propionic, glycolic, lactic, oxalic, malonic, maleic, tartaric, citric, hydroxymaleic, dihydroxymaleic, benzoic, salicylic, 4-aminosalicylic, methane sulfonic, ethane sulfonic or hydroxy-ethane sulfonic acid. Mono- or poly-salts may be formed.

The new thiazolidine-4-one compounds, the salts thereof and mixtures of such compounds inhibit the growth of various types of Mycobacteria, such as *Mycobacterium tuberculosis*, e.g. the human pathogenic strain H37 Rv of *Mycobacterium tuberculosis*, or *Mycobacterium leprae*, and may be used as antitubercular or antileprotic agents. For example, a good tuberculostatic activity may be obtained with those 2-phenyl-imino-3-phenyl-thiazolidine-4-ones, in which one of the phenyl radicals contains in 4-position an alkoxy group having 4 to 5 carbon atoms, and the other phenyl radical contains in 4-position a 2-pyridyl or a 2-(2-pyridyl)-ethenyl group.

The new compounds may be used as medicaments in the form of phamaceutical preparations, which contain the new thiazolidine-4-ones or the salts thereof or mixtures of such compounds in admixture with a pharmaceutical organic or inorganic, solid or liquid carrier suitable for enteral, e.g. oral, or parenteral administration. For making up the preparations there may be employed substances which do not react with the new compounds, such as water, gelatine, lactose, starches, stearic acid, magnesium stearate, stearyl alcohol, talc, vegetable oils, benzyl alcohols, gums, waxes, propylene glycol, polyalkylene glycols, petroleum jelly or any other known carrier for medicament. The pharmaceutical preparations may be in solid forms, for example, as tablets, capsules or dragees, or in liquid form, for example, as solutions, suspensions or emulsions. If desired, they may contain auxiliary substances, such as preserving agents, stabilizing agents, wetting or emulsifying agents, salts for varying the osmotic pressure or buffers. They may also contain, in combination, other therapeutically useful substances, particularly other tuberculostatic reagents, such as streptomycin, dihydrostreptomycin, 4-amino- salicylic acid or isonicotinic acid hydrazide, or other leprostatic compounds, such as sulfones, e.g. thiazolsulfone.

The new thiazolidine-4-ones, salts thereof or mixtures of such compounds may be prepared by reacting a 1,3-diphenyl-2-thiourea, in which one of the phenyl radicals contains in the 4-position a group of the formula Py—[C(R)=CH]$_n$—, in which Py, R and $n$ have the above-given meaning, and the other phenyl radical contains in the 4-position an N,N-di-lower alkyl-amino-lower alkoxy or an alkoxy group having from 4 to 5 carbon atoms, with a mono-halogeno acetic acid, a lower alkyl ester or a halide thereof, and, if desired, converting any resulting salt into the free base, and/or converting a free base obtained into a salt thereof, and/or, if desired, separating a resulting mixture into the single compounds.

A monohalogeno-acetic acid, a lower alkyl ester or a halide thereof is, particularly, a chloroacetic or bromoacetic acid, the methyl or ethyl esters, or the chloride thereof. The reaction is preferably carried out in a solvent, the selection of which depends largely on the nature of the reagents, for example, a lower alkanol, e.g. ethanol, if desired, in the presence of an alkali metal salt of a lower alkanoic acid, e.g. sodium acetate; an aromatic hydrocarbon, e.g. benzene; a halogenated hydrocarbon, e.g. choroform; or a lower carboxylic acid in the presence of an alkali metal salt of such an acid, e.g. glacial acetic acid in the presence of sodium acetate. If desired, the reaction may be completed more rapidly by refluxing the mixture for 2 to 8 hours. Any unreacted thiourea which contaminates the final product, may be identified by infrared studies or by the formation of an insoluble black precipitate upon addition of lead acetate to an alcoholic solution of the product. If necessary, the reaction may be completed by reacting the product containing any unreacted thiourea with an additional amount of the α-halogeno-acid or an ester thereof.

The starting materials used in this reaction may be prepared according to methods known for the preparation of analogous compounds. Thus, 1,3-diphenyl-substituted 2-thioureas may be prepared by reacting an appropriately substituted phenylisothiocyanate with a substituted aniline; for example, 4-isopentyloxyphenylisothiocyanate may be reacted with 4-(2-pyridyl)-aniline or 4-[2-(2-pyridyl)-ethenyl]-aniline to form the desired 1-(4-isopentyloxy-phenyl)-3-[4-(2-pyriyl)-phenyl] - 2 - thiourea and 1-(4-isopentyloxyphenyl) - 3 - {4-[2-(2-pyridyl)-ethenyl]-phenyl}-2-thiourea, respectively. The thioureas may also be used in the form of their acid addition salts.

The new thiazolidine-4-one derivatives may be obtained as a mixture of two isomers which may be separated into the two single compounds by ordinary methods, such as fractionated crystallization, adsorption and fractionated elution, etc. The mixtures may also be used as such.

Depending on the conditions used the new compounds are obtained in the form of the free bases or salts thereof. A salt may be converted into the free base in the customary way, for example, by treatment with an aqueous alkaline medium, such as an alkali metal hydroxide, e.g. sodium or potassium hydroxide; an alkali metal carbonate, e.g. sodium carbonate or potassium hydrogen carbonate; or ammonia. A free base may be transformed into its therapeutically acceptable acid addition salts by reaction with appropriate inorganic or organic acids, e.g. the acids outlined above, for example, in a lower alkanol, e.eg. methanol, ethanol, propanol or isopropanol, solution. A reaction product may also be obtained in the form of a hydrate; mono- or polysalts may be formed.

This is a continuation-in-part application of my application Serial No. 776,748, filed November 28, 1958 (now abandoned, which in turn is a continuation-in-part application of my application Serial No. 714,960, filed February 13, 1958 (now abandoned).

The following examples are intended to illustrate the invention, and are not to be construed as being limitations thereon. Temperatures are given in degrees centigrade.

*Example 1*

A mixture of 37.8 g. of 1-(4-isobutyloxy-phenyl)-3-[4-(2-pyridyl)-phenyl] - 2 - thiourea, 10.4 g. of chloroacetic acid and 16.4 g. of anhydrous sodium acetate is suspended in 300 ml. of ethanol and refluxed for 6 hours. The solution is filtered, the solvent removed and the residue extracted with benzene. The benzene is evaporated under reduced pressure and the mixture of 2-(4-isobutyloxyphenyl)-imino-3-[4-(2-pyridyl) - phenyl] - thiazolidine-4-one and 2-[4-(2-pyridyl)-phenyl] - imino-3 - (4 - isobutyloxy-phenyl)-thiazolidine - 4 - one is recrystallized from a mixture of benzene and methanol.

The mixture may be separated into the two compounds by fractionated crystallization using different solvent proportions of the recrystallization mixture.

*Example 2*

By reacting 39.1 g. of 1-(4-isopentyloxy-phenyl)-3-[4-(2-pyridyl)-phenyl]-2-thiourea with 10.4 g. of chloroacetic acid and 16.4 g. of sodium acetate according to the procedure described in Example 1, a mixture of 2-(4-isopentyloxy-phenyl)-imino - 3 - [4 - (2-pyridiyl-phenyl]-thiazolidine-4-one and 2-[4-(2-pyridyl)-phenyl[-imino-3-(4-isopentyloxy-phenyl)-thiazolidine-4-one is obtained, which may be separated as described in Example 1.

The starting material used in the above reaction may be prepared as follows: A solution of 3.4 g. of 4-(2-pyridyl)-aniline and 4.4 g. of 4-isopentyloxy-phenylisothiocyanate in 15 ml. of methanol is refluxed for fifteen minutes. The white precipitate, formed upon chilling, is filtered off and washed with ether. A second crop of crystalline material is obtained by diluting the filtrate with ether. The combined crops are dissolved in chloroform, the solution filtered through silicic acid and the filtrate diluted with pentane. The crystalline 1-(4-isopentyloxyphenyl)-3-[4-(2-pyridyl) - phenyl] - 2 - thiourea is filtered off, washed with pentane and dried, M.P. 128–128.5°; yield: 2.9 g.

*Example 3*

A mixture of 2-(4-n-butyloxy - phenyl)-imino-3-[4-(3-pyridyl)-phenyl]-thiazolidine-4-one and 2-[4-(3-pyridyl)-phenyl]-imino-3-(4 - n - butyloxy - phenyl)-thiazolidine-4-one, which may be separated into the two single compounds by fractionated crystallization, may be obtained by reacting 37.7 g. of 1-(4-n-butyloxy-phenyl)-3-[4-(3-pyridyl)-phenyl]-2-thiourea with 10.4 g. of chloroacetic acid and 16.4 g. of sodium acetate according to the procedure described in Example 1.

*Example 4*

A mixture of 37.8 g. of 1-(4-n-butyloxy-phenyl)-3-{4-[2-(2-pyridyl)-ethenyl] - phenyl} - 2 - thiourea, 10.4 g. of chloroacetic acid and 16.4 g. of anhydrous sodium acetate is suspended in 300 ml. of ethanol and refluxed for 6 hours. The solution is filtered, the solvent removed and the residue extracted with benzene. The benzene is evaporated under reduced pressure and the mixture of 2-(4-n-butyl-oxy-phenyl)-imino-3-{4-[2-(2-pyridyl)-ethenyl] - phenyl}-thiazolidine-4-one and 2 - {4 - [2-(2 - pyridyl) - ethenyl] phenyl}-imino-3-(4 - n - butyloxy - phenyl)-thiazolidine-4-one is recrystallized from a mixture of benzene and methanol. The mixture may be separated into the two compounds by fractionated crystallization using different solvent proportions of the recrystallization mixture.

The hydrochloride may be prepared by treating a cold ethanolic solution of the thiazolidine-4-one with hydrogen chloride and adding ether.

The starting material may be prepared as follows: A mixture of 7.9 g. of 4-[2-(2-pyridyl)-ethenyl]-aniline and 10.4 g. of 4-n-butyloxy-phenylisothiocyanate in 120 ml. of methanol is refluxed on the steam bath. A yellow precipitate forms after five minutes, and the reaction mixture is cooled after an additional two hours of refluxing. The solid material is filtered off and the 1-(4-n-butyloxy-phenyl)-3-{4-[2-(2-pyridyl)-ethenyl]-phenyl} - 2 - thiourea hemihydrate is recrystallized from anhydrous ethanol, M.P. 168–169°; yield: 11.0 g.

*Example 5*

By reacting 40.2 g. of 1-(4-isopentyloxy-phenyl)-3-{4-[2-(2-pyridyl)-ethenyl]-phenyl} - 2 - thiourea with 10.4 g. of chloroacetic acid and 16 g. of sodium acetate according to the procedure described in Example 3, a mixture of 2-(4 - isopentyloxy - phenyl) - imino-3-{4-[2-(2-pyridyl)-ethenyl]-phenyl}-thiazolidine - 4 - one and 2-{4-[2-(2-pyridyl) - ethenyl] - phenyl} - imino-3-(4-isopentyloxy-phenyl)-thiazolidine-4-one is obtained, which may be separated as described in Example 1.

The starting material may be prepared as follows: A solution of 7.9 g. of 4-[2-(2-pyridyl)-ethenyl]-aniline and 8.9 g. of 4-isopentyloxy-phenylisothiocyanate in a mixture of 20 ml. of methanol and 50 ml. of ethanol is refluxed on the steam bath for 3½ hours. The white precipitate, formed upon chilling, is filtered off and recrystallized from a mixture of isopropanol and ethanol to yield 6 g. of 1-(4-isopentyloxy-phenyl)-3{4-[2-(2-pyridyl)-ethenyl] - phenyl}-2-thiourea, M.P. 143.5–146°.

*Example 6*

A mixture of 2-(4-isobutyloxy-phenyl)-imino-3-{4-[2-(2-pyridyl)-ethenyl]-phenyl}-thiazolidine-4-one and 2-{4-[2-(2-pyridyl)-ethenyl]-phenyl}-imino-3-(4 - isobutyloxy-phenyl)-thiazolidine-4-one, which may be separated into the two single compounds by fractionated crystallization, may be obtained by reacting 19.4 g. of 1-(4-isobutyloxyphenyl)-3-{4-[2-(2-pyridyl) - ethenyl - phenyl} - 2 - thiourea with 5.2 g. of chloroacetic acid and 8 g. of sodium acetate according to the procedure described in Example 1.

The starting material may be prepared as follows: 7.9 g. of 4-[2-(2-pyridyl)-ethenyl]-aniline is dissolved in a mixture of 120 ml. of methanol and 75 ml. of ethanol, 10.5 g. of 4-isobutyloxy-phenylisothiocyanate is added to the warm solution, and the mixture is refluxed for three hours on the steam bath. The solution is concentrated to one-third of its original volume, the precipitate is filtered off after chilling and is washed with isopropanol. The resulting 1-(4-isobutyloxy-phenyl) - 3 - {4 - [2 - (2-pyridyl)-ethenyl]-phenyl}-2-thiourea is recrystallized from aqueous methanol, M.P. 139°.

By reacting 1-[4-(2-diethylaminoethoxy)-phenyl]-3-[4-(4-pyridyl)-phenyl]-2-thiourea, obtained by treating 4 - (4 - pyridyl) - aniline with 4 - (2 - diethylaminoethoxy)-phenylisothiocyanate, with chloroacetic acid in the presence of sodium acetate according to the procedure of Example 1, a mixture of the 2-[4-(2-diethylaminoethoxy) - phenyl] - imino - 3 - [4 - (4 - pyridyl)-phenyl] - thiazolidine - 4 - one and 2 - [4 - (4 - pyridyl) - phenyl] - imino - 3 - [4 - ( 2 - diethylaminoethoxy)-phenyl]-thiazolidine-4-one is obtained. Likewise, when 4-[4-(2-pyridyl)-butadienyl]-aniline and 4-n-butyl-oxy-phenylisothiocyanate are reacted together, the 1-{4-[4 - (2 - pyridyl) - butadienyl] - phenyl} - 3 - (4 - n-butyloxy-phenyl)-2-thiourea is formed, which, upon reaction with chloroacetic acid according to the procedure of Example 1, yields a mixture of 2-{4-[4-(2-pyridyl) - butadienyl] - phenyl} - imino - 3 - (4 - n - butyloxy - phenyl) - thiazolidine - 4 - one and 2 - (4 - n-butyloxy - phenyl) - imino - 3 - {4 - [4 - (2 - pyridyl)-butadienyl]-phenyl}-thiazolidine-4-one.

*Example 7*

By reacting 1-(4-isopentyloxy-phenyl)-3-{4-[2-methyl-2-(2-pyridyl)-ethenyl]-phenyl}-2-thiourea with chloroacetic acid in the presence of sodium acetate according to the procedure of the previous examples a mixture of 2 - (4 - isopentyloxyl - phenyl) - imino - 3 - {4 - [2-methyl - 2 - (2 - pyridyl) - ethenyl] - phenyl} - thiazolidine - 4 - one and 2 - {4 - [2 - methyl - 2 - (2 - pyridyl) - ethenyl] - phenyl} - imino - 3 - (4 - isopentyloxy-phenyl)-thiazolidine-4-one can be obtained, which may be separated into the single compounds by fractionated crystallization.

The starting material used in the above reaction may be prepared as follows: A mixture of 53.5 g. of 2-ethyl-pyridine, 75.6 g. of p-nitrobenzaldehyde and 52 g. of acetic acid anhydride is refluxed for seven hours. The cold mixture is poured into dilute aqueous hydrochloric acid, and made slightly basic with aqueous ammonia while stirring. The yellow 4-[2-methyl-2-(2-pyridyl)-ethenyl]-nitrobenzene is filtered off, washed, air dried and recrystallized from 95 percent ethanol, M.P. 98–100.5°; yield: 84 percent.

To a solution of 343 g. of stannous chloride in 535 ml. of concentrated aqueous hydrochloric acid is added 101 g. of 4-[2-methyl-2-(2-pyridyl)-ethenyl]-nitrobenzene; a light-colored paste is formed and heating is continued for one and one-half hours. The mixture is chilled, filtered, the solid material is washed and added to concentrated aqueous hydrochloric acid. The resulting suspension is poured into aqueous sodium hydroxide, so that the final pH=10–11, and the precipitate is filtered off, washed thoroughly with water and dried on the funnel. The solid material is extracted with ethanol in a Soxhlet apparatus, the solvent is evaporated and the light tan-colored 4-[2-methyl-2-(2-pyridyl)-ethenyl]-aniline is recrystallized from isopropanol, M.P. 118.5°; yield: 43 g.

A solution of 11.1 g. of 4-isopentyloxy-phenylisothiocyanate and 10.5 g. of 4-[2-methyl-2-(2-pyridyl)-ethenyl]-aniline in 100 ml. of anhydrous ethanol is refluxed for three hours, then filtered hot and the filtrate is chilled. The resulting 1-(4-isopentyloxy-phenyl)-3-{4-[ 2- methyl - 2 - (2 - pyridyl) - ethenyl] - phenyl} - 2-thiourea is filtered off, washed with a 1:1-mixture of ethanol and petroleum ether and recrystallized from isopropanol, M.P. 124.5–125.5°; yield: 15 g.

*Example 8*

A mixture of 2-(4-isobutyloxy-phenyl)-imino-3-{4-[2-methyl - 2 - (2 - pyridyl) - ethenyl] - phenyl} - thiazolidine - 4 - one and 2 - {4 - [2 - methyl - 2 - (2 - pyridyl) - ethenyl] - phenyl} - imino - 3 - (4 - isobutyloxy-phenyl)-thiazolidine-4-one, which can be separated into the single compounds by chromatography, may be obtained according the previously described procedure by reacting 1 - (4 - isobutyloxy - phenyl) - 3 - {4 - [2-methyl - 2 - (2 - pyridyl) - ethenyl] - phenyl} - 2 - thiourea with chloroacetic acid in the presence of sodium acetate.

The starting material may be prepared as follows: A mixture of 10.4 g. of 4-isobutyloxy-phenylisothiocyanate and 10.5 g. of 4-[2-methyl-2-(2-pyridyl)-ethenyl]-aniline in 75 ml. of ethanol is refluxed for three hours. Crystals are formed upon chilling and adding isopropanol; the 1 - (4 - isobutyloxy - phenyl) - 3 - {4 - [2 - methyl-2 - (2 - pyridyl) - ethenyl] - phenyl} - 2 - thiourea is filtered off, washed with isopropanol and then with pentane and recrystallized from isopropanol, M.P. 113–114°; yield: 11 g.

What is claimed is:

1. A member of the group consisting of 2-phenyl-imino-3-phenyl-thiazolidine-4-one, in which one of the phenyl radicals is substituted in the 4-position by a member of the group consisting of alkoxy having from 4 to 5 carbon atoms and N,N-di-lower alkyl-amino-lower alkoxy, and the other phenyl radical is substituted in the 4-position by the group of the formula $$Py—[C(R)=CH]_n—$$

in which Py stands for a member of the group consisting of 2-pyridyl, 3-pyridyl and 4-pyridyl, R represents a member of the group consisting of hydrogen and lower alkyl, and *n* represents a whole number from 0 to 2, and the therapeutically useful acid addition salts thereof.

2. 2 - phenyl - imino - 3 - phenyl - thiazolidine - 4-one, in which one of the phenyl radicals is substituted in the 4-position by alkoxy having from 4 to 5 carbon atoms and the other phenyl radical is substituted in the 4-position by 2-pyridyl.

3. 2 - (4 - isobutyloxy - phenyl) - imino - 3 - [4 - (2-pyridyl)-phenyl]-thiazolidine-4-one.

4. 2 - [4 - (2 - pyridyl) - phenyl] - imino - 3 - (4-isobutyloxy-phenyl)-thiazolidine-4-one.

5. 2 - (4 - isopentyloxy - phenyl) - imino - 3 - [4 - (2-pyridyl)-phenyl]-thiazolidine-4-one.

6. 2 - [4 - (2 - pyridyl) - phenyl] - imino - 3 - (4-isopentyloxy-phenyl)-thiazolidine-4-one.

7. 2 - phenyl - imino - 3 - phenyl - thiazolidine - 4-one, in which one of the phenyl radicals is substituted in the 4-position by alkoxy having from 4 to 5 carbon atoms and the other phenyl radical is substituted in the 4-position by 2-(2-pyridyl)-ethenyl.

8. 2 - (4 - isopentyloxy - phenyl) - imino - 3 - {4 - [2-(2-pyridyl)-ethenyl]-phenyl}-thiazolidine-4-one.

9. 2 - {4 - [2 - (2 - pyridyl) - ethenyl] - phenyl}-imino-3-(4-isopentyloxy-phenyl)-thiazolidine-4-one.

10. 2 - (4 - isobutyloxy - phenyl) - imino - 3 - {4 - [2-(2-pyridyl)-ethenyl]-phenyl}-thiazolidine-4-one.

11. 2 - {4 - [2 - (2 - pyridyl) - ethenyl] - phenyl}-imino-3-(4-isobutyloxy-phenyl)-thiazolidine-4-one.

References Cited in the file of this patent

UNITED STATES PATENTS

| | | |
|---|---|---|
| 2,820,039 | Doub et al. | Jan. 14, 1958 |
| 2,857,393 | Mizzoni | Oct. 21, 1958 |